Aug. 29, 1939.   H. S. JANDUS ET AL   2,170,900
BRAKE LEVER CONSTRUCTION
Filed April 1, 1938
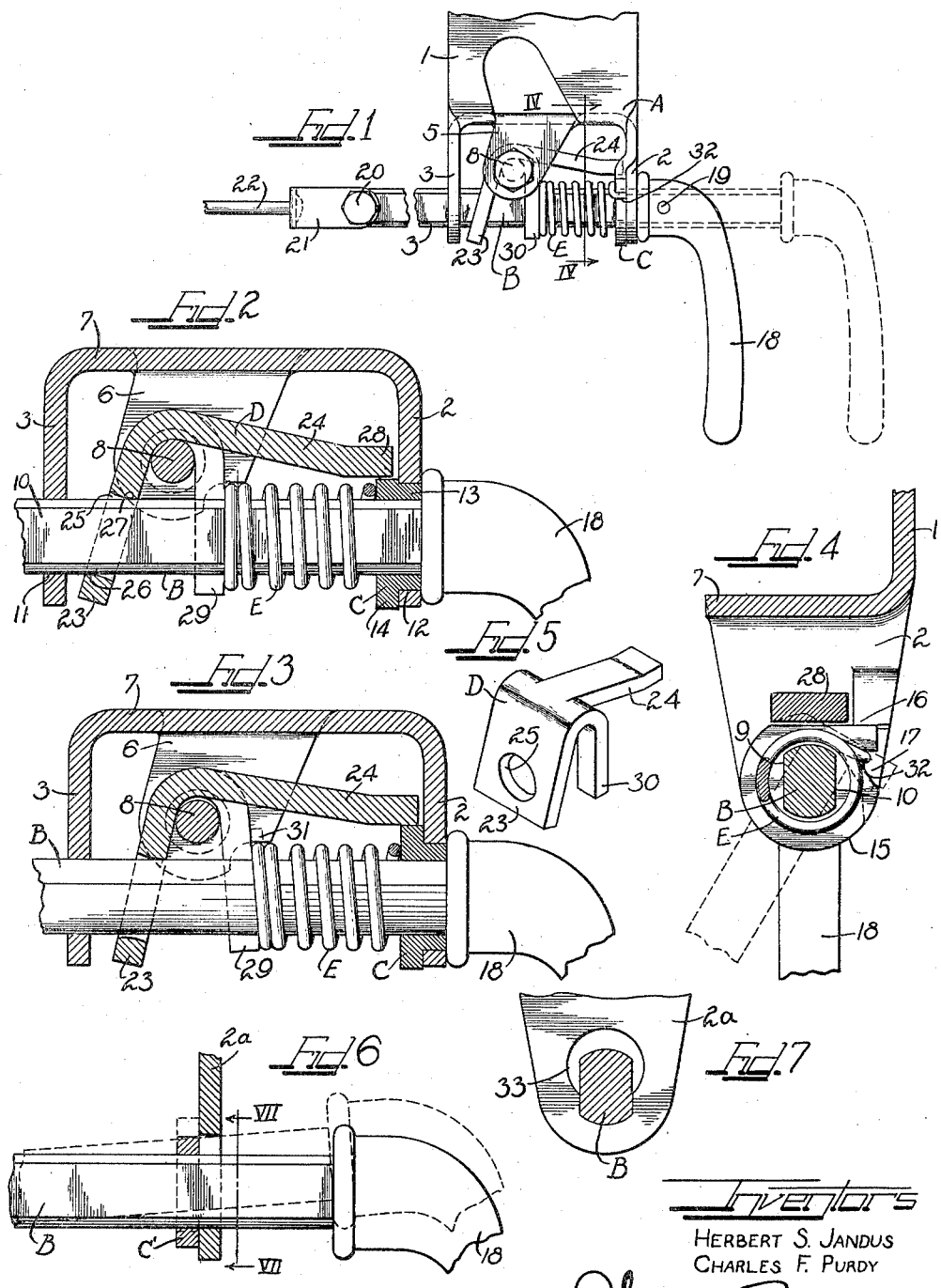

Patented Aug. 29, 1939

2,170,900

UNITED STATES PATENT OFFICE 2,170,900

BRAKE LEVER CONSTRUCTION

Herbert S. Jandus and Charles F. Purdy, Detroit, Mich., assignors, by mesne assignments, to Houdaille-Hershey Corporation, Detroit, Mich., a corporation of Michigan Application April 1, 1938, Serial No. 199,376

6 Claims. (Cl. 74—531)

The present invention relates to brake lever construction and more particularly to a brake operating device for automotive vehicle brakes whereby the brakes are set and released by endwise movement of a rod suitably connected to the brake mechanism.

An object of the present invention is to provide an emergency brake operating means which is simple in construction, durable and efficient in use, and which may be readily applied in place.

A further object of the present invention is to provide a brake operating mechanism for automotive vehicles which may be mounted adjacent the instrument boards of the vehicles and operable by a push-pull action, and in which friction locking means are utilized for maintaining the brakes in set position.

A still further object of the present invention is to provide brake actuating mechanism for automotive vehicles whereby the brakes are applied by a straight line pulling movement and locked by friction means and releasable by a slight tilting or swinging movement of the actuator.

The invention has for a further object the provision of a straight type pull brake actuating device for automotive vehicle brakes, wherein the actuator is held in adjusted position by friction means.

The invention has for an additional object the provision of a novel release mechanism for a straight pull type of brake lever actuators.

A further object of the present invention is to provide a control device to hold an element in adjusted position, operable by a straight line pulling action, and locked by friction means and releasable by a tilting or swinging movement of the actuator.

Generally speaking, the invention contemplates a rod or bar arranged for endwise and oscillatable movement adapted by endwise pull in one direction to set the brakes, together with means for frictionally engaging the rod to hold it in adjusted position, together with release mechanism operable by a slight rotative movement of the rod.

The above, other, and further objects of the present invention will be apparent from the following description and accompanying drawing.

The accompanying drawing illustrates embodiments of the present invention, and the views thereof are as follows:

Figure 1 is fragmental side elevational view of one form of the present invention, illustrating an attaching bracket, an endwise movable rod, and showing, in full lines, the parts in "off" position.

Figure 2 is an enlarged longitudinal sectional view through the bracket of Figure 1, showing the parts in "off" position.

Figure 3 is a view similar to Figure 2, showing the manner of releasing the locking link from holding engagement with the bar or rod.

Figure 4 is an enlarged transverse sectional view taken substantially in the plane indicated by lines IV—IV of Figure 1.

Figure 5 is an isometric view of the novel locking link construction of the present invention.

Figure 6 is a modification of the invention showing one manner of maintaining the bar or rod against accidental oscillatory movement, showing in full lines the rod locked against such movement and in dotted lines the position to which the rod may be moved to effect intentional oscillatory movement.

Figure 7 is a fragmental transverse sectional view taken on the line VII—VII of Figure 6.

The drawing will now be explained.

The form of the invention chosen to exemplify it contemplates a bracket A, formed as a stamping with a substantially vertical part 1 adapted to be fastened to a suitable support behind the instrument board of an automotive vehicle. Front and rear legs 2 and 3 extend downwardly and are suitably apertured. A part 4 is stamped out of the vertical part 1 and bent downwardly to constitute a side member 5. A similar side member 6 is formed on the opposite portion of the horizontal part 7 of the bracket, the parts 5 and 6 being apertured to receive a pivot pin, bolt or rivet 8.

A rod B is fashioned with opposite flat faces 9 and 10, with intervening portions of its surface cylindrical.

The rear leg 3 is apertured to receive the rod, the aperture being circular, as at 11.

The front leg 2 has a larger aperture 12, aligned with the aperture 11 in the rear leg 3.

A cam washer C is formed with a cylindrical hub 13 entered in the aperture 12 of the leg 2 and with a flange part 14 bearing against the inner face of the leg adjacent the aperture. The peripheral portion of this flange 14 is circular for a portion of its extent, as at 15, with the balance flat as at 16. The flange 14 is notched, as at 17, for a purpose to be later explained. The cam washer C is centrally apertured to conform to the cross sectional contour of the rod B, so that the rod and the cam washer may be prevented from relative rotative movement, while allowing sliding movement of the rod through the washer. The outer extremity of the rod has a handle 18 secured to it, as by means of a pin 19. The other end of the rod is connected by means of a bolt or rivet 20 to a clevis 21, which in turn is fastened to the brake mechanism of the vehicle as by a pull rod or cable 22.

The rod B is thus mounted for endwise movement in the legs 2 and 3, and also with respect to the cam washer C. The rod is also mounted for oscillatory movement in the legs.

Rockably mounted on the pivot 8 is a locking link member D, shown in isometric form in Figure 5, with angular legs 23 and 24 which are bent to rock about the pivot 8, in substantially right angular relationship. The leg 23 is formed with an opening 25 to encompass the rod B, the opening being slightly greater than the diameter of the rod, with the edges 26 and 27 of the opening adapted to frictionally engage the rod on opposite portions of it, to lock the rod against movement in one direction, that is, in retrograde movement, after it has been pulled to brake setting position. The leg 24 of the member D extends forwardly and overlies the flange 14 of the cam member C, with an end portion 28 normally spaced a slight distance from the flat face 16 of the periphery of the cam washer, as shown in Figures 2 and 4.

The member D is formed with two depending legs 29 and 30 arranged to straddle the rod B and laterally spaced from each other a distance slightly greater than the diameter of the rod.

Surrounding the rod B between the legs 29 and 30 and the cam washer C, is a torsional spring E. One end of the spring is shown as at 31 in hooked engagement with the bracket 6. The other end 32 of the spring is shown as in engagement with the notch 17 of the flange 14 of the cam member C.

The purpose of the spring E is two-fold: first, it exerts pressure against the legs 29 and 30 to tilt the portion 23 of the locking link into frictional locking engagement with the rod, that is to say applies the necessary pressure to the locking member to hold it in frictional engagement with the rod; and second, it exerts torsional action on the cam member C and consequently the rod B, to normally maintain the flat portion 16 of the cam member C underlying the tailpiece or leg 24 of the locking member D thereby maintaining the parts of the structure in position to effect locking engagement of the member D with the rod, and at the same time to retain the handle 18 in inoperative position, which is vertically downward, as viewed in the drawings.

The mechanism operates as follows:

The parts are shown in the drawing in inoperative or normal position, that is, the position occupied when the brake is in "off" position.

To set the brakes, the operator grasps the handle 18 pulling it to the right, as viewed in the drawing, whereby the handle moves endwise through the opening in the leg 23 of the member D and through the cam member C, compressing the spring E. As soon as the rod B has been pulled out sufficiently to set the brakes, the operator releases his grip of the handle, whereupon the spring E acting against the legs 29 and 30 of the member D tilts the part 23 of the member D into locking engagement with the rod B and thus holds it against retrograde movement and holds it against the resistance of the brake mechanism, thereby locking the brakes in set position.

To release the brakes, the operator grasps the handle 18 and swings it, to rotate the rod in one direction, clockwise as viewed in Figure 4, which movement causes the flat face 16 of the cam member D to elevate the adjacent end of the leg or tailpiece 24 of the member D thus moving the portion 23 of the member D in counter clockwise direction and freeing it from frictional holding engagement with the rod, thereby enabling return of the rod to normal or "off" position which is a movement of the rod to the left as viewed in the drawings.

As soon as the rod has been returned to its normal or "off" position, the operator lets go of the handle 18, whereupon the torsional spring E will swing the handle back into the full line position of Figure 4, and the action of the spring E will then rock the portion 23 of the member D into locking and frictional holding engagement with the rod.

Should it be desired to provide means for preventing accidental oscillatory movement of the rod which might be occasioned by someone striking the handle E, when the brake is in set position, then the front leg 2A would be provided with a notch 33 of the general form shown in Figure 7. A portion of this notch would be circular, and a portion of it would be such as to receive the rod B in it, in engagement with the flat faces of the rod to prevent rotative movement of the same. With this construction, to oscillate the rod or bar B, the bar is raised to dotted line position of Figure 6 to free it from engagement with the lower part of the slot 33 to enable rotative movement of it in such direction as to cause the cam washer C' to raise the adjacent tailpiece 24 of the link member D.

In this form of the invention, the cam member C' would have an aperture through it contoured to closely fit the rod B but without the hub portion 12, the periphery of the cam member C' being substantially the same as the peripheries 15 and 16 of the cam member C of the form heretofore described.

It will be observed that the brake lever construction of the present invention is simple, positive in operation, and is one in which the straight pull of brake lever actuator may be employed and a friction locking device utilized for holding the actuator in adjusted position.

It will be observed that in this invention, the rod B is movable relatively to the locking member D, the member D being rockably supported so as not to travel with the brake pull rod.

The parts are illustrated as requiring substantially a 30° swing of the handle 18 from the normal inoperative position shown in full lines in Figure 4 to the release position shown in dotted lines in Figure 4. It is to be understood, however, that this 30° movement is not a limitation but may be any angular movement sufficient to carry out the concept of the present invention.

The invention has been described herein more or less precisely as to details, yet it is to be understood that the invention is not to be limited thereby, as changes may be made in the arrangement and proportion of parts, and improvements may be substituted without departing from the spirit and scope of the invention.

The invention is claimed as follows:

1. A brake operating device for automotive vehicles including a bracket adapted to be mounted behind the instrument board of a vehicle and having spaced legs, a rod supported by said legs for endwise and oscillatory movement, a locking link rotatably supported between said legs and having an opening embracing the rod with edges of the opening effective for frictional grip of the rod when the link is tilted, means operable by rotative movement of the rod in one direction for freeing the link from engagement with the rod, and spring means for tilting said link into holding engagement with the rod and for normally restraining said rod against rotative movement in said one direction.

2. A brake operating device for automotive vehicles including a bracket adapted to be mounted behind the instrument board of a vehicle and having spaced legs, a rod supported by said legs for endwise and oscillatory movement, a locking link rockably supported between said legs and having an opening embracing the rod with edges of said opening effective for frictional grip of the rod when the link is tilted, cam means operable by rotative movement of said rod in one direction for rocking said link to free it from engagement with said rod, and spring means for tilting said link into holding engagement with said rod and also effective for normally maintaining said cam means out of engagement with said locking link.

3. A brake operating device for automotive vehicles including a bracket adapted to be mounted behind the instrument board of a vehicle and having front and rear legs, a rod supported by said legs for endwise and oscillatable movement, said bracket having downwardly extending side legs, a locking link rockably supported by said side legs and having an opening embracing the rod with edges of the opening effective for frictional grip of the rod when the link is tilted, said locking link having a tailpiece extending along said rod, cam means operable by rotative movement of said rod in one direction for engaging said tail piece to free the link from holding engagement with the rod, and spring means acting against the locking link and said cam means for normally holding said link in engagement with said rod and said cam means away from said tailpiece.

4. A brake operating device for automotive vehicles including a bracket adapted to be mounted behind the instrument board of a vehicle and having spaced legs, said legs being apertured, a cam washer having a hub entered in the aperture of one of said legs, a rod passing through said cam washer and the aperture in the other leg for endwise and oscillatable movement, said cam washer and rod having surface engagement for allowing relative axial movement but preventing relative rotative movement, a locking link rockably supported by said bracket and having an opening embracing the rod with edges of the opening effective for frictionally gripping the rod when the link is tilted, said locking link having a tail piece overlying said cam washer, spring means surrounding said rod and acting against said link to normally maintain it tilted to hold it in frictional engagement with said rod, said spring means acting against said cam washer to normally maintain it away from said tail piece, the construction being such that rotative movement of the rod in one direction will rotate the cam to engage the tailpiece of said locking member to disengage said member from holding engagement with the rod to thereby allow movement of the rod in retrograde direction.

5. A brake operating device for automotive vehicles including a bracket adapted to be mounted behind the instrument board of the vehicle and having spaced legs, a rod supported by said legs for endwise and oscillatable movement, a locking link rockably supported by said bracket and having an opening embracing the rod with edges of the opening effective for frictionally engaging said rod when the link is tilted, said rod being movable relatively to said link, a cam operable by rotative movement of the rod in one direction for freeing the link from holding engagement with said rod, and a torsion spring about said rod secured at its extremities to said bracket and said cam for normally restraining said rod and cam against rotative movement in said one direction and with its ends pressing against said link and cam to normally maintain said link in tilted holding engagement with said rod, and said rod and cam being arranged for relative axial movement but prevented from relative rotative movement.

6. A control device comprising a bracket, a rod supported by said bracket for endwise and oscillatable movement, a handle connected to one end of said rod for moving it, a member rockable on said bracket and having an opening embracing said rod with the edges of the opening effective for frictionally engaging said rod to hold it against retraction from any position to which it has been moved in endwise direction, a collar about said rod oscillatable with it for disengaging said member from holding engagement with said rod when said rod has been rotated in one direction, and means exerting pressure against said member in a direction axially of said rod for normally maintaining said member in holding engagement with said rod and also exerting rotative action against said collar to restrain said rod and collar from rotative movement in a direction to disengage said member from its holding engagement with said rod.

HERBERT S. JANDUS.
CHARLES F. PURDY.